UNITED STATES PATENT OFFICE.

ROBERT C. BUCKLEY, OF PEORIA, ILLINOIS.

FERTILIZED GRAIN AND PROCESS OF MAKING SAME.

1,125,457. Specification of Letters Patent. Patented Jan. 19, 1915.

No Drawing. Application filed April 22, 1914. Serial No. 833,720.

*To all whom it may concern:*

Be it known that I, ROBERT C. BUCKLEY, a citizen of the United States, residing at Peoria, in the county of Peoria, State of Illinois, have invented certain new and useful Improvements in Fertilized Grain and Processes of Making Same; and I do hereby declare the following to be a full, clear, and exact description of the invention, such as will enable others skilled in the art to which it appertains to make and use the same.

The object of this invention is to fertilize grain before planting the same in the ground. This fertilization of the grain is produced by the following process: In the preparation of the carrying out of this process it is necessary that three separate receptacles be provided and in one receptacle a solution of salt-peter is put. The second receptacle is provided with the desirable amount of pitch tar and the same is heated until in a viscous state, while the third receptacle contains the desired amount of lime. After these materials have been provided and in their proper conditions the seed which is to be planted, and it is to be understood that any kind of seed may be treated by this process, is first soaked in the solution of salt-peter and is removed therefrom and submerged in the soft pitch tar. After a short while the grain is removed from this tar and is dropped into the third receptacle and into the lime therein. When the seed has thus been treated and coated with the lime it is removed from the last receptacle and is in condition for planting. By treating the grain in this way the grain is fertilized before it is planted in the ground, thus greatly facilitating the growing of the grain and consequently better crops may be produced after the grain has been treated by this process than was possible before.

What is claimed is:—

1. A process of fertilizing grain comprising, first soaking the grain in a solution of salt-peter and removing it therefrom then submerging it in viscous pitch tar removing it therefrom and finally submerging it in lime.

2. An article of manufacture comprising a grain impregnated with a solution of salt-peter, a coating of pitch tar on said grain and a coating of lime on said tar.

In testimony whereof, I affix my signature, in the presence of two witnesses.

ROBERT C. BUCKLEY.

Witnesses:
CHARLES E. ULRICH,
R. V. ULRICH.